United States Patent
Zhang et al.

(10) Patent No.: US 7,953,668 B2
(45) Date of Patent: May 31, 2011

(54) METHOD AND APPARATUS FOR RESERVING DIGITAL RIGHTS

(75) Inventors: Jiang Zhang, La Jolla, CA (US); Alexander Medvinsky, San Diego, CA (US); Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 760 days.

(21) Appl. No.: 11/446,668

(22) Filed: Jun. 5, 2006

(65) Prior Publication Data
US 2007/0282751 A1    Dec. 6, 2007

(51) Int. Cl.
*G06F 21/00*    (2006.01)
(52) U.S. Cl. .................................. 705/57; 705/58
(58) Field of Classification Search ............... 705/57, 705/58
See application file for complete search history.

(56) References Cited

U.S. PATENT DOCUMENTS

| | | | |
|---|---|---|---|
| 2004/0111379 A1* | 6/2004 | Hicks et al. | 705/76 |
| 2006/0184454 A1* | 8/2006 | Ananda | 705/57 |
| 2006/0242159 A1* | 10/2006 | Bishop et al. | 707/10 |
| 2007/0073728 A1* | 3/2007 | Klein et al. | 707/10 |
| 2007/0073963 A1* | 3/2007 | Fontijn et al. | 711/111 |
| 2007/0124483 A1* | 5/2007 | Marples et al. | 709/228 |
| 2008/0319953 A1* | 12/2008 | DeShan et al. | 707/3 |
| 2010/0030744 A1* | 2/2010 | DeShan et al. | 707/3 |

* cited by examiner

*Primary Examiner* — Pierre E Elisca
(74) *Attorney, Agent, or Firm* — Stewart M. Wiener

(57) ABSTRACT

The present invention discloses an apparatus and method for reserving a set of requested rights. In one example, the digital rights data associated with digital content information is found in a remaining rights file using a license index. A portion of the digital rights data is subsequently reserved. A determination is made as to whether a content download associated with the digital content information is successful. If the content download is unsuccessful, then the reserved portion of the digital rights data is cancelled. Alternatively, if the content download is successful, then the remaining rights file is updated to reflect a use of the portion of the digital rights data.

20 Claims, 3 Drawing Sheets

METHOD AND APPARATUS FOR RESERVING DIGITAL RIGHTS

BACKGROUND OF THE INVENTION

1. Field of the Invention

Embodiments of the present invention generally relate to the persistent storage of digital content as well as the utilization of digital rights management functions for securely communicating content between network components. More specifically, the present invention relates to a method and apparatus for reserving digital rights.

2. Description of the Related Art

Digital content information has recently gained wide acceptance in the public. Such digital content includes, but is not limited to: movies, videos, music, and the like. Consequently, many consumers and businesses employ various digital media devices or systems that enable the reception of such digital multimedia contents via several different communication channels (e.g., a wireless satellite link or a wired cable connection). Similarly, the communication channel may be a telephony based connection, such as DSL and the like.

However, the transport and utilization of digital content can present certain problems. One such problem that currently exists is the reuse of an original license to continuously gain access to digital content information. Notably, a user can create a backup of the original license file and subsequently consume the associated digital content information with the original license file. Conventionally, the original license file is not located in a secure storage medium. Thus, a user can regain the consumed digital rights by overwriting the "partially consumed" original license (which now has one less "digital right") with the backed up version of the original license file (which contains the digital right previously used). By repeating this process, a user can conceivably possess an unlimited license.

Another problem typically associated with the transport of digital rights data with counted rights (such as a limit on a number of playbacks or a number of copies) is the significant amount of time required to download, copy, or move a large digital content file. If the necessary digital rights are not available to consume the requested content after downloading, then the downloaded digital content information is useless and a waste of resources. Typically, the delivery of a decryption key to the user (i.e., the client device) signifies the consumption of the digital content information. However, the decision of when to deliver a decryption key for a particular download is problematic. If the key is delivered from a first device to the second device prior to the download (i.e., while the user determines if digital rights are available), then the rights on the first device (e.g., number of available playbacks) have to be reduced accordingly and the user may lose the digital rights without consuming the digital content, e.g., if the download procedure fails due to the lack of disk space or other storage failure. Conversely, if the decryption key is delivered after the downloading process has completed, then the digital rights on the first device have not yet been reduced and may be consumed by another device within the home network during the content download. Thus, the requesting device will not be able to access the requested content when the download process is completed.

Thus, there is a need in the art for a method and apparatus for reserving digital rights.

SUMMARY OF THE INVENTION

In one embodiment, the present invention discloses an apparatus and method for reserving a set of requested rights. Specifically, the digital rights data associated with digital content information is found in a remaining rights file using a license index. The remaining rights file contains only the types of rights that dynamically change each time the digital content is accessed (such as number of remaining playbacks, number of remaining copies, remaining moves, etc.). The remaining rights file is kept small so that it can be more easily protected by a secure hardware or software module. While stored within a secure module, it may not be possible to make a backup copy of the remaining rights and then restore an older version that would provide a user with more rights than to what he is entitled to.

A portion of the digital rights data is subsequently reserved. A determination is made as to whether a content download associated with the digital content information is successful. If the content download is unsuccessful, then the portion of the digital rights data is cancelled. Alternatively, if the content download is successful, then the remaining rights file is updated to reflect a use of the portion of the digital rights data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
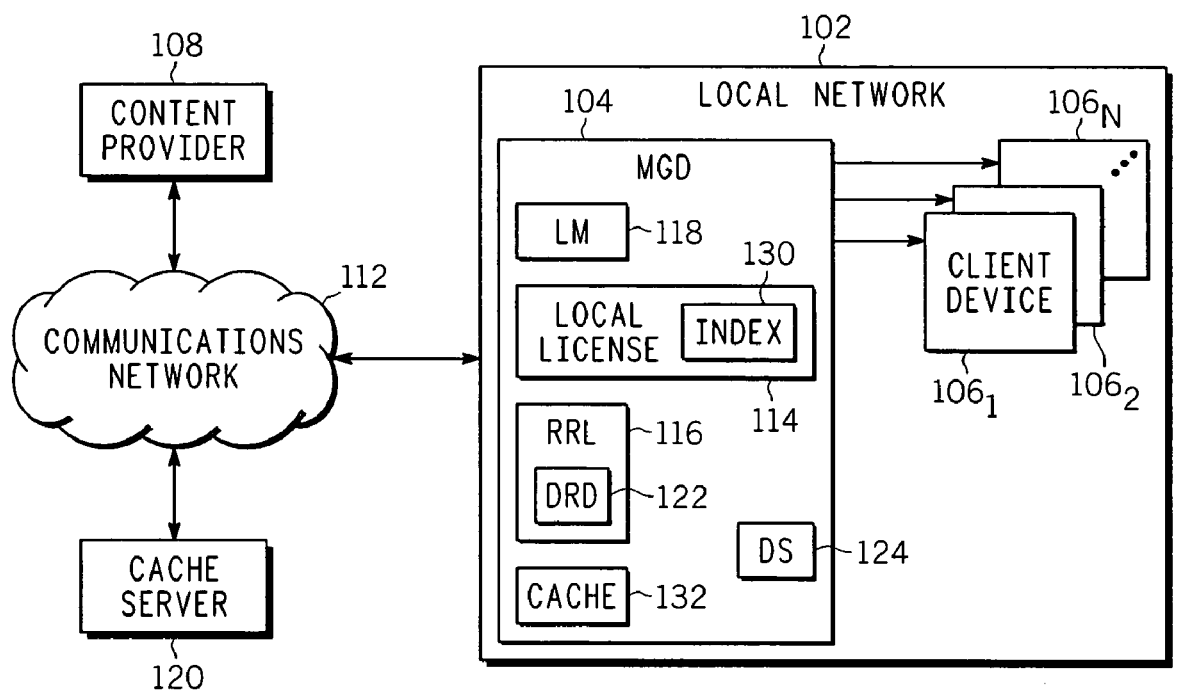
FIG. 1 depicts a block diagram of a system for facilitating the streaming of digital content over a communications network in accordance with the present invention.

FIG. 1 is a block diagram of a content distribution system 100 (e.g., the Motorola Internet Protocol Rights Management (IPRM) system) that utilizes an authenticated key management protocol (e.g., MOTOROLA ESBroker™ protocol) to facilitate the secure transfer of digital rights and content. The key management protocol may be any type of protocol that provides key management and security in accordance with an exemplary embodiment of the present invention.

In one embodiment, the system 100 comprises a remote content provider 108 (e.g., a download or streaming server), a communications network 112 (e.g., the Internet), a cache server 120, and a local network 102. Although only one content provider 108, one cache server 120, and one local network 102 are depicted, those skilled in the art realize that any number of content providers, cache servers, or local networks may be included in the system 100.

The local network 102 may comprise a home network that includes a media gateway device (MGD) 104 and a plurality of client devices $106_{1 \ldots N}$. Each of the devices $106_{1 \ldots N}$ may comprise a set top box (STB), a digital video recorder (DVR), a portable media player (PMP), a video cell phone, a personal computer (PC), and the like. These devices may be used to provide digital content (e.g., a movie) to viewing devices, such as a television, computer monitor, and the like (not shown). Similarly, the media gateway device 104 may comprise a single device (e.g., a STB, a DVR, a PC, etc.), or a plurality of devices, designated to function as a media hub for the local network 102. The media gateway device 104 facilitates communication between the local network 102 and the other components of the system 100. In addition, the media gateway device 104 exchanges messages with the devices 106$_{1\ldots N}$ in order to register a client device, provide decryption keys needed to view content from a content provider 108, and the like.

The MGD 104 comprises a license management (LM) module 118, a local content license file 114, remaining rights list (RRL) file 116, a cache 132, a disk storage 124, and a license index 130. In one embodiment, the LM module 118 is a software module that manages the persistent content and content licenses within a home network (i.e., local network 102). Although shown to reside in the MGD 104, in one embodiment, a separate LM module may reside in each of the client devices 106$_{1\ldots N}$ in the absence of an MGD. The LM 118 is responsible for receiving an original license file from a content provider 108 and creating a "two-part" local license. The LM 118 creates the first part of the local license by extracting the changeable digital rights data 122 portion of the original license file and placing it in a secure storage area (e.g., a RRL file 116). In one embodiment, the secure storage area may comprise a secure memory module that is accessible only by secure applications that are validated by a secure processor that ensures the applications are from a trusted source (e.g., via a digital code signature). The changeable rights portion may be embodied as the remaining digital rights (i.e., the number of plays, copies, etc. remaining) associated with a particular piece of digital content information. The digital rights are placed in secure storage in order to prevent a user from gaining access, and subsequently overwriting the digital rights or replacing them with an old backup copy of the same remaining rights. Namely, a user may attempt to transfer an older version (i.e., the previous status) of the digital rights in order to re-gain the previously consumed changeable digital rights. The remaining portions, typically the static unchangeable rights, of the original license file becomes the local license file 114 (as shown in FIG. 1) and are typically cryptographically signed and stored in a hard drive or other conventional storage medium, such as disk storage 124. The local license file does not need to be protected inside secure storage because unlike the remaining rights, the local license file is static and there is no benefit for an attacker to restore an older version of the local license file. The disk storage 124 may also be used to store content recorded from cable channels or encrypted persistent content downloaded from the cache server 120 or the content provider 108. In one embodiment, the local license file includes a Local Content ID, a Global Content ID, persistent rights, and a decryption key of the digital content information.

The RRL file 116 is the file that contains the changeable portion of each local license created by the LM 118. More specifically, the digital rights (i.e., the number of remaining uses, such as play, copy, etc.) of each local license is stored in a single RRL file 116 so that the entire local license does not have to be modified. Upon the creation of the local license, the LM 118 inserts a locally unique license index for each license file. The license index is used to link the local license with its corresponding digital rights data portion. Notably, the index lists the location of the digital rights data in the RRL 116. The RRL file 116 is typically stored in a secure file system or storage area that cannot be accessed by the users and cannot be backed up and later restored from an old image. Each time the remaining digital rights data is changed, the RRL file 116 is updated immediately. This is to prevent a user from turning off the power of the client device to avoid a rights update.

The remote content provider 108 may comprise a streaming server that provides the digital content information requested by the client devices 106$_{1\ldots N}$. More specifically, the remote content provider 108 distributes encrypted digital content information to the MGD in the local network 102 where the content information is ultimately provided to the appropriate client device 106. In one embodiment, the content provider 108 may be configured to utilize the caching servers (e.g., cache server 120) throughout the system 100 to assist (e.g. optimize) with the distribution of content information to the MGD (or like device) residing in the local network(s).

In one embodiment of the present invention, a client device 106 transmits a request for digital content information (e.g., a movie, a pay-per-view sporting event, etc.). Depending on the configuration of the local network 102, the request may be sent directly to the content provider 108 or may be initially received by an MGD 104. If an MGD 104 is utilized, the MGD 104 determines if the requested digital content information exists in its persistent storage (e.g., disk storage 124). If the requested content is present, then the MGD 104 may verify the license of the requested persistent digital content and provide the content to device 106. Conversely, if the requested digital content does not exist, then the MGD 104 may forward the request to the content provider 108. If the request is to download or record the content persistently, then the downloaded content may be stored on the MGD 104 in the event the device 106 does not have any persistent content storage capability. Similarly, the MGD 104 ultimately receives a set of digital rights along with the digital content from the content provider 108 (which is associated to the downloaded or recorded digital content file). The persistent content file is encrypted and the decryption key is encrypted and stored in the local license file.

Upon receipt of the digital rights, the LM module 118 creates an original content license file called the local license file 114. The LM 118 then identifies the changeable portion of the local license file that corresponds to the digital rights data (i.e., the portion of the license that enumerate the number of uses) and stores it as an entry in an RRL file 116. Depending on the embodiment, the changeable portion of the local license file may either be extracted or just copied to the RRL file 116. The remaining portion of the local license file 114 can be stored in a cheaper insecure data storage medium, such as a hard disk (e.g., disk storage 124). Secure storage is not necessary since the remaining portion of the local license file is digitally signed and there is no need for a user to change this portion of the local license file. A restore of an old copy of the local license file, therefore, cannot result in an increased set of user rights for that content. Conversely, the RRL file 116 is stored in a secure storage area or a secure memory that prevents a user or client device 106 from changing the remaining rights portion of the license (e.g., copying the data and overwriting the updated version later). Similarly, the LM 118 records the location in the RRL file 116 where the changeable portion (e.g., digital rights data 122) of the local license file 114 is placed. In one embodiment, the LM 118 accomplishes this by recording the location of the entry in the license index 130. The license index 130 effectively serves as a link between the digital rights data 122 stored in the RRL file 116 and the remaining portion of the local license 114. Notably, in the event the client device 106 requests the persistent content associated with the local license 114 (which is stored on the MGD), the MGD acquires the local license 114. The MGD then obtains and uses the license index 130 to retrieve the remaining digital rights data 122 (i.e., the current status) from the RRL file 116 to validate if the device 106 is authorized to access the requested content.

The present invention also incorporates a reservation tool in the LM 118 to resolve the aforementioned decryption key delivery problem. Notably, when the client device 106 makes a request to check for available digital rights data prior to the downloading of content, the LM 118 reserves a portion of the digital rights data as requested (e.g., one or more digital rights for either playing or copying the digital content information) by the requester so other devices in the local network 102 cannot consume the reserved portion of digital rights. In one embodiment, the LM 118 accomplishes this by placing the requested rights in a cache 132. While in the cache 132, the requested rights cannot be used by another device in the local network 102. Also, the number of remaining digital rights 122 is not decremented while the portion of the digital rights data is reserved in the cache 132. Thus, if the downloading of the desired digital content information ultimately fails, the reserved digital right can be cancelled. Conversely, if the download succeeds, the requesting device is able to retrieve the decryption key(s) in order to view the digital content. Once the decryption keys are obtained by the device, the RRL file 116 is immediately updated (e.g., the digital rights data 122 is decremented by "1" or by some other reserve value) in order to reflect that the digital content is "consumed."

Figure 2:
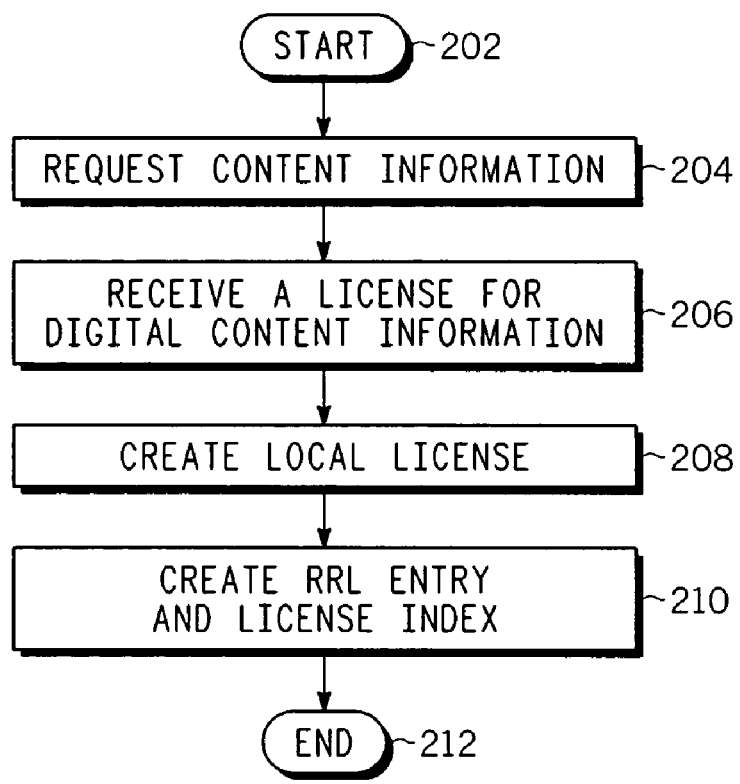
FIG. 2 depicts a method for creating a local license in accordance with the present invention.

FIG. 2 illustrates a method 200 for creating a local license in accordance with the present invention. The method 200 begins at step 202 and proceeds to step 204, where a request for digital content information is made. In one embodiment, the MGD 104 transmits a digital content request for a particular client device in the local network 102 to a content provider 108. In another embodiment, the MGD 104 may transmit a digital content request for its own benefit. In yet another embodiment, the request is transmitted directly from the client device 106 (e.g., an embodiment that does not utilize an MGD 104).

At step 206, a license is received. In one embodiment, the MGD 104 receives an original license file from the content provider 108. The original license file may comprise a session rights object (SRO), which contains at least one persistent entitlement (PE). A PE is a form of license that is used by the MGD (or client device) to utilize (e.g., play, copy, etc.) the requested digital content information.

At step 208, a local license is created. In one embodiment, the LM 118 generates a local license 114 by making a copy of the original license file. At step 210, an RRL entry and corresponding license index 130 are created. In one embodiment, the LM 118 copies (or extracts) the changeable portions from the local license 114 and stores it as digital rights data 122 in the RRL file 116. The non-extracted "remaining" portions of the local license typically comprise sections that are static or unchangeable by the user. The LM 118 also creates a license index 130 that acts as a link between the local license file 114 and the associated entry in the RRL file 116. The method 200 then ends at step 212.

Figure 3:
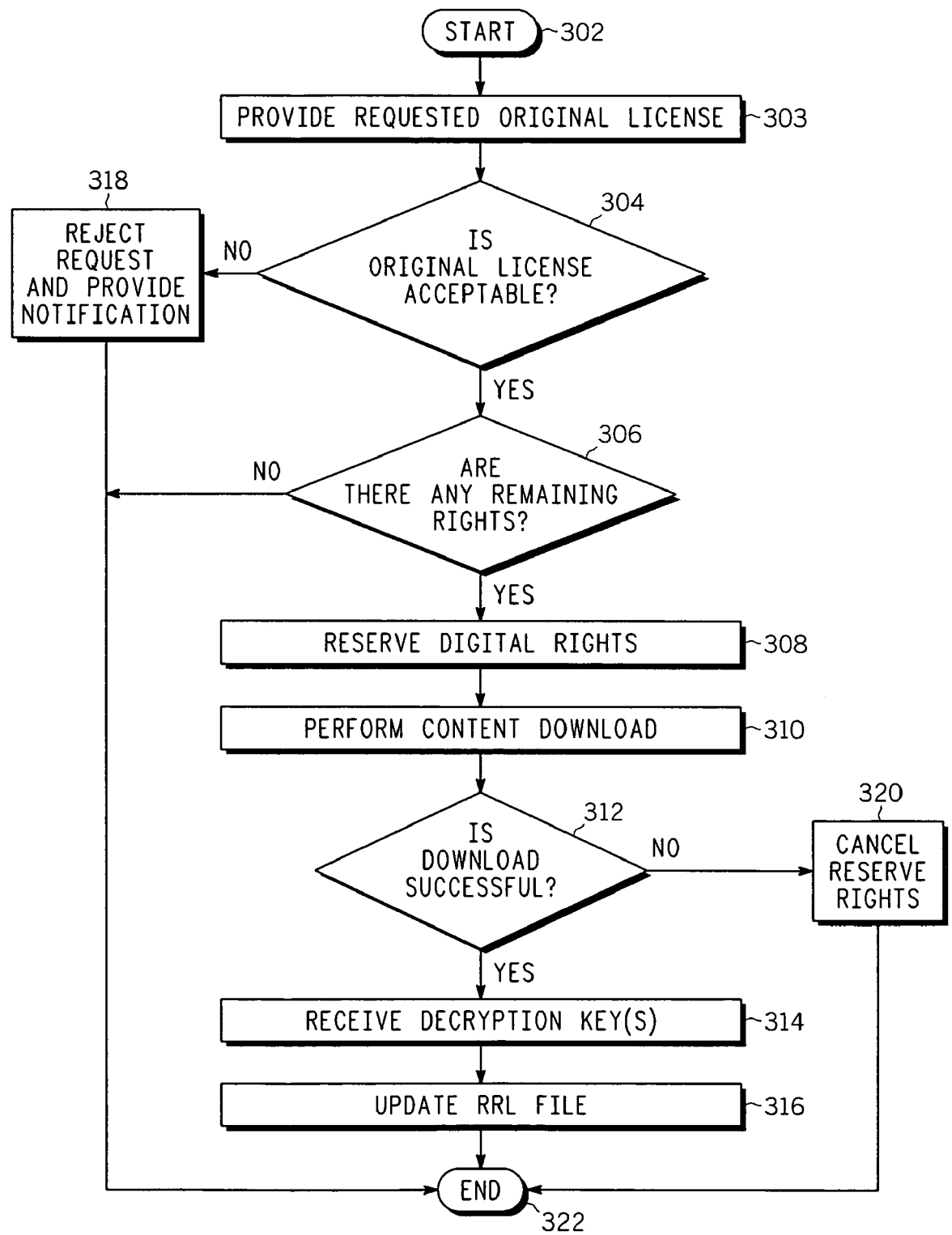
FIG. 3 depicts a method for reserving digital rights in accordance with the present invention.

FIG. 3 illustrates a method 300 for reserving a local license in accordance with the present invention. The method 300 begins at step 302 and proceeds to step 303, where the requested digital rights are provided. In one embodiment, the MGD 104 passes in the requested digital rights to the LM 118.

At step 304, a determination is made as to whether the original license is still valid (e.g., not expired) and whether or not it permits the requested operation (e.g., if content is permitted to be played back outside of the original device). In one embodiment, the LM 118 uses the original license (i.e., the combination of the local license (created in step 208 of method 200) and the associated RRL entry (generated in step 210)) to validate the client device's rights. Namely, the LM 118 verifies if the requested digital rights match the original license. If the original license is invalid or does not permit the requested operation, then the method 300 continues to step 318 where the LM 118 rejects the content request and notifies the MGD 104 of the rejection. If the original license is approved, then the method 300 continues to step 306.

At step 306 available digital rights data is checked. In one embodiment, the LM 118 accesses the RRL 116 (using the index 130) in order to determine if there are any available digital rights. If any remaining digital rights data still exists, then the method proceeds to step 308, where the LM 118 reserves a portion of the digital rights as requested (e.g., a "single" digital right) for the requesting client device 106 in a cache 132. By accomplishing this, other devices in the local network 102 cannot consume any remaining rights that are already designated for the requesting client device. This still enables multiple requesting client devices to make requests at the same time so long as the total sum of all of the requested rights for specific content is allowed by the remaining rights. In one embodiment, the LM 118 may first check the static digital rights portion of the local license prior to reserving the digital rights. By inspecting this data prior to this reserving step (e.g., checking expiration periods or general permissions to download requested content), unnecessary downloading of digital content may be avoided. If the LM 118 determines that there aren't any digital rights remaining, the method 200 proceeds to step 322 and ends.

At step 310, the encrypted digital content information is downloaded. In one embodiment, the client device 106 receives the downloaded content information from the MGD 104.

At step 312, a determination is made as to whether the digital content information download is successful. If the digital content information does not successfully download, the method 300 proceeds to step 320, where the reserved digital rights data stored in the cache 132 are cancelled. Consequently, the RRL file 116 will not be updated and the client device does not lose any remaining rights (i.e., the digital rights data 122 in the RRL 116 will not be decremented). However, if the downloading process is a success, the method 300 continues to step 314.

At step 314, decryption keys are provided to the client device 106. In one embodiment, the LM 118 obtains the decryption keys from the local license 114 and provides them to the client device 106 along with the requested digital content information.

At step 316, the RRL file 116 is updated. In one embodiment, the LM 118 records that the decryption keys were delivered to the client device 106 and immediately updates the RRL file 116 to reflect the transaction. Notably, the digital rights data in the RRL 116 file will be decremented by the number of rights requested. The method 300 then ends at step 322.

Figure 4:
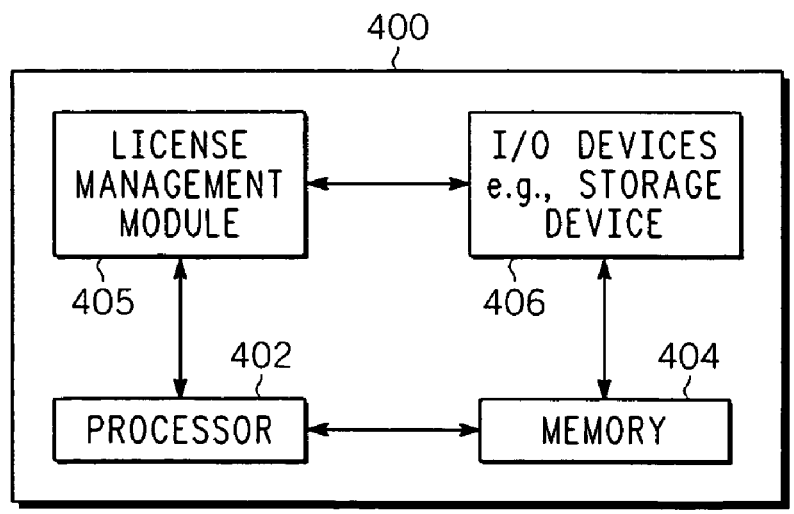
FIG. 4 is a block diagram depicting an exemplary embodiment of a computer suitable for implementing the processes and methods described herein.

FIG. 4 depicts a high level block diagram of a Media gateway device or general purpose computer suitable for use in performing the functions described herein. As depicted in FIG. 4, the system 400 comprises a processor element 402 (e.g., a CPU), a memory 404, e.g., random access memory (RAM) and/or read only memory (ROM) and/or persistent memory (Flash), a license management module 405, and various input/output devices 406 (e.g., storage devices, including but not limited to, a tape drive, a floppy drive, a hard disk drive, a compact disk drive, a receiver, a transmitter, a speaker, a display, a speech synthesizer, an output port, and a user input device (such as a keyboard, a keypad, a mouse, etc.) and the like.

It should be noted that the present invention can be implemented in software and/or in a combination of software and hardware, e.g., using application specific integrated circuits (ASIC), a general purpose computer or any other hardware equivalents. In one embodiment, the license management module or process 405 can be loaded into memory 404 and executed by processor 402 to implement the functions as discussed above. As such, the present license management module 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for reserving a set of requested rights, comprising:
    at a media gateway device:
    locating digital rights data associated with digital content information in a remaining rights file using a license index;
    reserving a portion of said digital rights data;
    determining if a content download associated with said digital content information is successful;
    canceling said portion of said digital rights data if said content download is unsuccessful; and
    updating said remaining rights file to reflect a use of said portion of said digital rights data if said content download is successful.

2. The method of claim 1, wherein said remaining rights file is stored in a secure storage medium.

3. The method of claim 1, wherein said updating is initiated by a delivery of at least one decryption key to a client device.

4. The method of claim 1, wherein said remaining rights file comprises a plurality of digital rights data respectively associated with a plurality of different types of digital content information.

5. The method of claim 1, further comprising:
    requesting said digital content information;
    receiving an original license for said digital content information;
    utilizing said original license to create a local license;
    creating an entry in said remaining rights file, wherein said entry comprises an extraction of a digital rights portion from said local license; and
    generating said license index that links said entry with a remaining portion of said local license.

6. The method of claim 5, wherein said license index is stored in said remaining portion of said local license.

7. The method of claim 5, further comprising:
    inspecting said remaining portion prior to said reserving said portion of said digital rights data.

8. The method of claim 5, wherein said extraction of said digital rights portion comprises a changeable portion of said digital rights data.

9. An apparatus for reserving a set of requested rights, comprising:
    a memory;
    a license management module configured to:
        locate digital rights data associated with digital content information in a remaining rights file using a license index and
        reserve a portion of said digital rights data; and
    a processor configured to:
        determine if a content download associated with said digital content information is successful,
        cancel said portion of said digital rights data if said content download is unsuccessful, and
        update said remaining rights file to reflect a use of said portion of said digital rights data if said content download is successful.

10. The apparatus of claim 9, wherein said remaining rights file is stored in a secure storage medium.

11. The apparatus of claim 9, wherein said update is initiated by a delivery of at least one decryption key to a client device.

12. The apparatus of claim 9, wherein said remaining rights file comprises a plurality of digital rights data respectively associated with a plurality of different types of digital content information.

13. The apparatus of claim 9, further comprising:
    a communication interface for requesting said digital content information and receiving an original license for said digital content information; and
    the license management module further configured to:
        utilize said original license to create a local license,
        create an entry in said remaining rights file, wherein said entry comprises an extraction of a digital rights portion from said local license, and
        generate said license index that links said entry with a remaining portion of said local license.

14. The apparatus of claim 13, wherein said extraction of said digital rights portion comprises a changeable portion of said digital rights data.

15. A non-transitory computer readable medium having stored thereon instructions that, when executed by a processor, causes the processor to perform a method for reserving a set of requested rights, comprising:
    locating digital rights data associated with digital content information in a remaining rights file using a license index;
    reserving a portion of said digital rights data;
    determining if a content download associated with said digital content information is successful;
    canceling said portion of said digital rights data if said content download is unsuccessful;
    updating said remaining rights file to reflect a use of said portion of said digital rights data if said content download is successful.

16. The computer readable medium of claim 15, wherein said remaining rights file is stored in a secure storage medium.

17. The computer readable medium of claim 15, wherein said remaining rights file comprises a plurality of digital rights data respectively associated with a plurality of different types of digital content information.

18. The computer readable medium of claim 15, further comprising:
    requesting said digital content information;
    receiving an original license for said digital content information;
    utilizing said original license to create a local license;

creating an entry in said remaining rights file, wherein said entry comprises an extraction of a digital rights portion from said local license; and generating said license index that links said entry with a remaining portion of said local license.

19. The computer readable medium of claim 18, wherein said license index is stored in said remaining portion of said local license.

20. The computer readable medium of claim 18, further comprising:

inspecting said remaining portion prior to said reserving said portion of said digital rights data.

* * * * *